United States Patent [19]
Alverio

[11] Patent Number: 5,467,670
[45] Date of Patent: Nov. 21, 1995

[54] METHOD OF MANUFACTURE FOR ROTARY CUTTING TOOL

[75] Inventor: John Alverio, Macomb Township, Mich.

[73] Assignee: General Motors Corporation, Detroit, Mich.

[21] Appl. No.: 288,710

[22] Filed: Aug. 15, 1994

[51] Int. Cl.$^6$ .................................... B21K 5/02
[52] U.S. Cl. ........................... 76/108.6; 76/104.1
[58] Field of Search ............................. 76/101.1, 104.1, 76/108.6, 115, DIG. 8; 30/350, 346.54; 408/144, 224, 230; 407/119

[56] References Cited

U.S. PATENT DOCUMENTS

| | | | |
|---|---|---|---|
| 4,266,449 | 5/1981 | Bielby | 76/115 |
| 4,594,034 | 6/1986 | Maier | 408/230 |
| 4,645,389 | 2/1987 | Maier | 408/230 |
| 5,038,641 | 8/1991 | Shen et al. | 76/108.6 |
| 5,038,642 | 8/1991 | Alverio et al. | 76/108.6 |
| 5,129,188 | 7/1992 | Alverio | 51/288 |
| 5,173,014 | 12/1992 | Agapiou et al. | 408/59 |
| 5,201,616 | 4/1993 | Alverio | 408/224 |
| 5,291,812 | 3/1994 | Yen et al. | 82/134 |

*Primary Examiner*—Douglas D. Watts
*Attorney, Agent, or Firm*—Patrick M. Griffin

[57] ABSTRACT

A method is disclosed for CVD wear coating of carbide rotary cutting tools without jeopardizing the sharpness and utility of the cutting edges. Initially, the tool is finish ground on all surfaces but for the cutting edges and the trailing relief surfaces adjacent thereto, which are left rough ground and "high". Then the entire tool is CVD coated with a suitable material at a very high temperature. This provides a tough coating, but embrittles or decarburizes the cutting edges. Next, the relief surfaces are finish ground, which brings all surfaces to final specification, sharpens the cutting edges, and removes the brittle layers. While the CVD coating is removed just behind the cutting edge, the relief surfaces behind the cutting edges are not as needful of a wear coating as the rake surfaces ahead of the cutting edges.

1 Claim, 1 Drawing Sheet

METHOD OF MANUFACTURE FOR ROTARY CUTTING TOOL

BACKGROUND OF THE INVENTION

Rotary cutting tools, such as drills or milling cutters, have a generally cylindrical body and a plurality of sharp cutting edges. The cutting edges are not surfaces as such, but sharp lines formed by the intersection of two other surfaces, specifically an axial flute face ground along the length of the tool and a generally planar relief surface, also known as a flank face. There are as many cutting edges as there are pairs of these intersecting surfaces. The axial flute faces, also known as rake faces, lead the sharp cutting edges, while the flank faces trail the cutting edge. As the cutting edges cut into a metal workpiece surface, chips form and curl continually along the rake faces, moving axially along the flutes and clear of the cutting interface. The rake face especially is subject to wear by the chips, and is also subject to buildup from workpiece material that can literally weld itself to the surface. Consequently, it is desirable to coat the cutting tool surfaces with a protective, wear reducing layer.

One of the most common cutting tool base materials is tungsten carbide, often referred to simply as carbide. Carbide is not a practical material for the entire cutting tool body, and will usually constitute just an insert or cutting tip that is brazed or otherwise secured to a less brittle steel shank. Coatings typically used to protect the carbide fall into two broad categories in terms of how they are applied, physical vapor deposition, abbreviated as PVD, and chemical vapor deposition, or CVD. Physical vapor deposition, a term broad enough to encompass evaporation, ion plating and sputtering, is the lower temperature process of the two, although by no means is it a low temperature process, occurring at around 800 degrees F. A typical material for a PVD process would be titanium nitride. In CVD, temperatures may be more than twice as high. The material does vaporize to a molecular state at the higher temperature, so a chemical reaction does occur on the base material surface to be coated, giving a much tougher and thicker coating. Coating materials may include titanium carbide, aluminum oxide, and others.

A real drawback of the CVD process is that the higher temperatures may have a deleterious effect on the base material. The surface of the carbide, for example, may be decarburized and embrittled, especially where there is a sharp, exposed cutting edge. Another problem is that the CVD coating may build up excessively at the cutting edge, effectively rounding and dulling it. Furthermore, where a carbide insert is brazed to a steel shank or cutter body, the braze seam can melt. Therefore, the conventional wisdom is that a CVD process cannot be used in any cutting application where very sharp cutting edges are needed.

SUMMARY OF THE INVENTION

The invention provides a process in which CVD coated rotary cutting tools can be given sharp edges. In the embodiment disclosed, an end mill includes four axial flutes, and so ultimately forms four cutting edges where the rake faces of the flutes intersect the flank faces. Initially, all major surfaces of the tool head except the flank faces and some equivalent surfaces are finish ground, that is, ground to their final print specifications. The flank faces are deliberately left rough ground initially. Consequently, the initial cutting edges formed by the intersection of the rough ground flank faces and the rake faces are also not at final print specification. The tool is then wear coated by a high temperature, chemical vapor deposition process, which coats all surfaces exposed, but which also occurs at a temperature high enough to embrittle the sharp, rough ground cutting edges. Only then are the flank faces aground to final specification. Final grind of the flank faces serves to remove the embrittled layer, bringing the cutting edges to final print specification. While this also removes the CVD wear layer from the flank face, the CVD layer is left on all other major surfaces, including the critical rake faces. If desired, a final coating with a PVD wear layer can be carried out without damage to the newly ground and sharpened cutting edges.

DESCRIPTION OF THE PREFERRED EMBODIMENT

These and other features of the invention will appear from the following written description, and from the drawings, in which.

Figure 1:
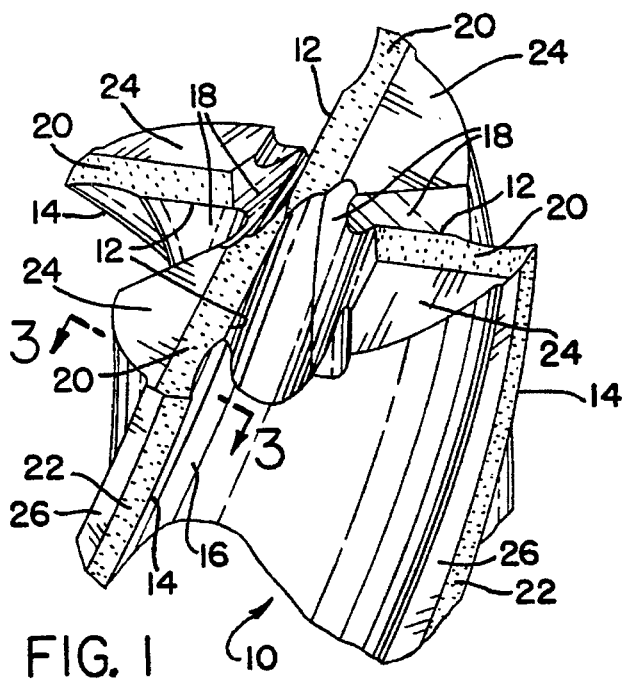
FIG. 1 is a perspective view of the end of a rotary cutting tool processed according to the invention.

Referring first to FIG. 1, a rotary cutting tool made according to the invention, indicated generally at 10, is an end mill of the type that has a solid body, or a solid body end portion, as opposed to an indexable insert end mill. What this denotes is not the material per se but the fact that the cutting edges are integral to the solid body, and not part of separate, small inserts secured to the tool body. Here, since entire end mill 10, or at least the part of it illustrated, would preferably be a material such as carbide. In some cases, just the end or head would be carbide, which would be brazed to a steel shank, which is not illustrated. The process disclosed could be applied to a separate cutting insert as well, however. An end mill like 10 would be used to smoothly machine a flat surface, removing a rough layer from it through successive runs. Consequently, it requires both end cutting edges 12, which would be substantially parallel to the surface machined, and side cutting edges 14 perpendicular thereto, of which there are four each in the embodiment disclosed. How these cutting edges are produced and protected is the subject of the disclosed process.

Figure 2:
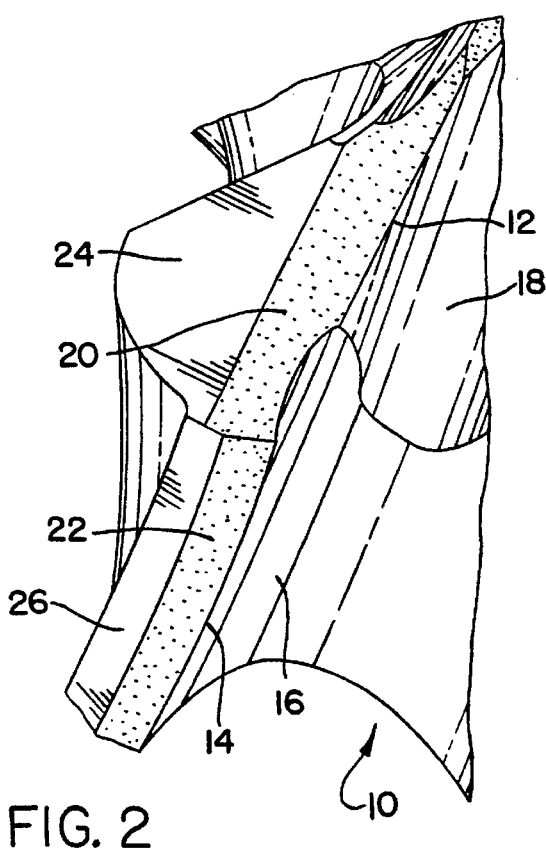
FIG. 2 is an enlarged view of one flute and cutting edge.

Referring next to FIG. 2, an enlargement of one pair of the four pairs of cutting edges 12 and 14 is sufficient to illustrate the entire end mill 10. Four identical helical flutes 16 cut into the sides of end mill 10 create an exit path away from the workpiece interface for cut chips, just as they would on a drill. While not absolutely flat, that part of the flute 16 surface directly adjacent to the cutting edges 12 and 14 constitutes a rake face for the cutting edge 14, and for part of edge 12. The rest of the rake face for end cutting edge 12 is provided by one side of a trough shaped chip removal gash 18, which feeds chips directly into a respective flute 16. The rake faces provided by the flutes 16 and chip removal gashes 18 lead the cutting edges 12 and 14 since the end mill 10 rotates counterclockwise from the perspective of FIG. 2. The other surfaces most relevant to the cutting edges 12 and 14 are the surfaces that trail them and which, where they intersect the flutes 16 and gashes 18, actually create the cutting edges 12 and 14. These are four end flank faces 20 and four side flank surfaces 22, which are at the outer diameter of the tool, and highlighted by stippling in FIGS. 1 and 2. The end flank faces 20 intersect both the ends of the flutes 16 and the chip removal gashes 18 to create the end cutting edges 12, and the side flank surfaces 22 intersect the sides of the flutes 16 to create the side cutting edges 14. The flank faces 20 and 22 are themselves each trailed by a secondary relief surfaces 24 and 26 respectively, which have nothing directly to do with the shape of the cutting edges 12 and 14, but provide extra cutting clearance. The machining and coating of the surfaces just described are carried out according to the process described in detail below.

Figure 3:
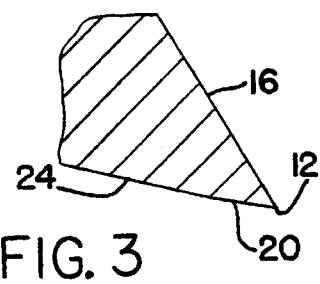
FIG. 3 is a cross section of a cutting edge and its adjacent surfaces taken along the line 3—3 of FIG. 1, before the CVD coating process.

Referring next to FIG. 3, the condition of the cutting edge 12 and adjacent surfaces prior to any coating is illustrated. In general, all surfaces of the end mill 10 but for the flank faces 20 and 22 are finish ground initially, that is, ground to final print specification. The flank faces 20 and 22, by contrast, are rough ground. By "rough ground" it is not meant that these surfaces are not smooth, but rather that more material would have to be ground off of them to bring them to final print specification, they are "high", in effect. This is deliberate, and the degree to which the rough ground surfaces are "high," the thickness of material that would have to be ground off, is designed to be just equal to or greater than the thickness of base carbide material that is likely to be jeopardized by the particular coating material and temperatures used, described next.

Figure 4:
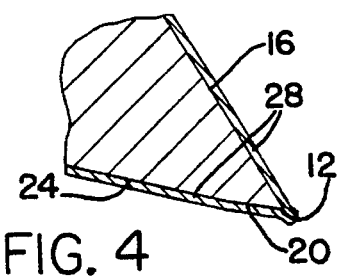
FIG. 4 is a view like FIG. 3 shown just after the CVD coating process.

Referring next to FIG. 4, the condition of the surfaces of FIG. 3 after the initial coating process is illustrated. A coating of suitable wear resistant material, such as titanium carbide, is applied by a standard CVD process, indicated schematically by the cross hatched layer at 28. Such a process, as noted above, occurs at temperatures that may be as high as 2000 degrees F. This is above the threshold temperature at which the carbide base material can and will become embrittled, especially sharp and exposed edges thereof. The embrittlement problem is exacerbated if it is desired to apply several successive layers of CVD coating. It should be kept in mind that while FIG. 3 illustrates the most relevant surfaces, all surfaces of end mill 10 become coated, even those that may not especially need the protection. There would be no particular advantage, however, in masking any areas off, which would just be an additional step.

Figure 5:
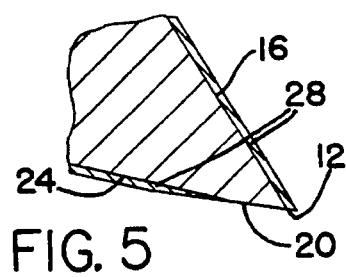
FIG. 5 is a view like FIG. 4 after the finish grinding of the cutting edges.
Figure 6:
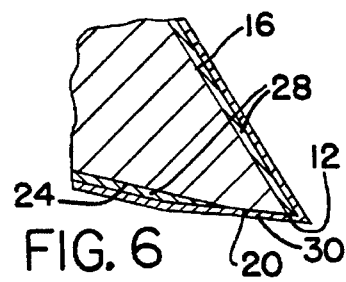
FIG. 6 is a view like FIG. 5 after a final PVD coating process of the finish ground surfaces.

Referring next to FIGS. 5 and 6, the next step in the process is to finish grind both the end flank faces 20 and the side flank 22. This accomplishes several things. First, it brings those surfaces, including the cutting edges 12 and 14, to final specification. More importantly, it removes any embrittlement and excessive buildup that may have occurred at the edges 12 and 14, and would have subjected them to chipping or fracture. It also removes the CVD layer 28 from those surfaces, but they are not as needful of a wear resistant coating as are other surfaces, such as the rake faces. Furthermore, the edges 12 and 14 and the surfaces 20 and 22 are not left totally unprotected. This is because the CVD layer 28 on the surface of flute 16 still provides a shield, in effect, at the intersection with the newly ground and denuded surfaces, that is, at the cutting edges 12 and 14. If extra wear protection is desired on flank faces 20 and 22, a PVD coating of suitable material can be provided, shown at 30.

Figure 7:
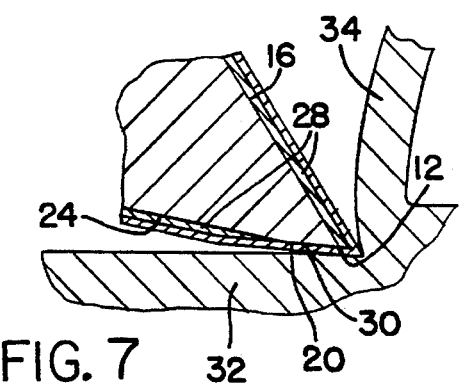
FIG. 7 is a view of the finished cutting edge in operation.

As seen in FIG. 7, the operation of tool 10 on a workpiece 32, the rake faces provided by the flutes 16 and chip removal gashes 18 see the most direct and potentially wearing contact with workpiece chips 34, which continually curl along the surfaces. The CVD layer 28 protects the rake surfaces directly, as well as shielding the cutting edges 12 (and 14). The PVD layer 28 protects the adjacent flank faces 20 and 22. Since PVD layer 28 also coats the flutes 16 and chip gashes 18, it does provide some additional wear protection. Tool life is significantly increased, with essentially no extra cost as compared to a conventional coating process.

The process may be applied to any rotary cutting tool with a surface or sharp edge that is potentially subject to embrittlement, such as a drill. Or, the process could be applied to a carbide insert that is separably fastened to a cutter body. Even more significant, the process is ideal for inserts or tool heads that are brazed to a steel shank or tool body. The high temperature CVD coating process can be carried out before the brazing step. After brazing, finish grinding and the lower temperature PVD coating can be done without melting the braze seam. Therefore, it will be understood that it is not intended to limit the invention to just the embodiment disclosed.

The embodiments of the invention in which an exclusive property or privilege is claimed are defined as follows:

1. A method for manufacturing a rotary cutting tool of the type having a plurality of sharp cutting edges, each of which is formed by the intersection of a relief surface trailing said cutting edge and a rake surface leading said cutting edge, and in which the base material of said tool is a carbide material in which sharp edges are subject to embrittlement if treated at temperatures above a predetermined threshold, comprising the steps of, grinding all surfaces of said tool to a final shape but for said relief surface, which is rough ground initially, coating said tool surfaces by chemical vapor deposition with a layer of wear resistant material at a temperature above said predetermined threshold, finish grinding said relief surface to sharpen said cutting edge and remove embrittled material from said edge, and, coating said finish ground relief surface with a different wear resistant material at a temperature below said threshold temperature.

* * * * *